US 6,587,433 B1

(12) United States Patent
Borella et al.

(10) Patent No.: US 6,587,433 B1
(45) Date of Patent: Jul. 1, 2003

(54) REMOTE ACCESS SERVER FOR MULTIPLE SERVICE CLASSES IN IP NETWORKS

(75) Inventors: Michael S. Borella, Naperville, IL (US); Igor Lasic, Brighton, MA (US); Ikhlaq S. Sidhu, Vernon Hills, IL (US); Vandana Upadhyay, Evanston, IL (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/247,836

(22) Filed: Feb. 10, 1999

Related U.S. Application Data

(60) Provisional application No. 60/109,953, filed on Nov. 25, 1998.

(51) Int. Cl.[7] .............................. H04J 3/14; H04L 12/56
(52) U.S. Cl. .................... 370/230; 370/235; 370/401; 370/420
(58) Field of Search ................................. 370/230, 252, 370/352, 389, 391, 395.21, 395.42, 401, 420, 421, 444, 236, 230.1, 231, 235

(56) References Cited

U.S. PATENT DOCUMENTS 6,011,804 A * 1/2000 Bertin et al. ................ 370/468
6,160,793 A * 12/2000 Ghani et al. ................ 370/236
6,167,027 A * 12/2000 Aubert et al. ............... 370/230
6,249,519 B1 * 6/2001 Rangachar .................. 370/356

OTHER PUBLICATIONS

Memorandum entitled Remote Authentication Dial In User Server (RADIUS) by C. Rigney, A. Rubens, W. Simpson and S. Willens, dated Apr. 1997.

* cited by examiner

Primary Examiner—Chau Nguyen
Assistant Examiner—Soon-Dong Hyun
(74) Attorney, Agent, or Firm—McDonnell Boehnen Hulbert & Berghoff

(57) ABSTRACT

A method and system for assigning priority or classes of service of messages delivered in a packet-based network. The method and system allows for implementation of differentiated classes of service according to the requirements of the network application or user.

19 Claims, 6 Drawing Sheets

Router Stamping

| VER | IHL | TOS | TOTAL LENGTH |
|---|---|---|---|
| IDENTIFICATION | | | FRAGMENT OFFSET |
| TIME-TO-LIVE | | PROTOCOL | HEADER CHECKSUM |
| SOURCE ADDRESS | | | |
| DESTINATION ADDRESS | | | |
| OPTIONS | | | |

IP HEADER

USER PROFILE DATABASE 400

| USER NAME | USER ID | DEVICE1 | DEFAULT | SECONDARY | ALTERNATE 1 | ALTERNAT 2 | ALTERNATE 3 |
|---|---|---|---|---|---|---|---|
| | 412 | 414 | 416 | 418 | 420 | 422 | 424 |
| GUIDO SCHUSTER | schuster | PC | DS BYTE | DS BYTE 0 | DS BYTE 1 | DS BYTE 2 | DS BYTE 3 |
| IKHLAQ SIDHU | sidhu | PC | DS BYTE | DS BYTE 0 | DS BYTE 1 | DS BYTE 2 | DS BYTE 3 |
| JACEK GRABIEC | grabiec | PC | DS BYTE | DS BYTE 0 | DS BYTE 1 | DS BYTE 2 | DS BYTE 3 |
| MICHAEL BORELLA | borella | PC | DS BYTE | DS BYTE 0 | DS BYTE 1 | DS BYTE 2 | DS BYTE 3 |
| . | . | . | . | . | . | . | . |
| . | . | . | . | . | . | . | . |

410

Modem Stamping

Router Stamping

REMOTE ACCESS SERVER FOR MULTIPLE SERVICE CLASSES IN IP NETWORKS

STATEMENT OF RELATED APPLICATION

This application claims the benefit under 35 U.S.C. §119 (e) of U.S. Provisional Patent Application Serial No. 60/109,953, filed Nov. 25, 1998, entitled "Remote Access Server for Multiple Service Classes in IP Networks" for all common subject matter disclosed therein.

FIELD OF THE INVENTION

This invention relates in general to a method and device for providing different levels or classes of packet delivery service in a packet-based network.

BACKGROUND OF THE INVENTION

Today, Internet Protocol or "IP" networks such as the Internet currently support a single class of best-effort service to deliver digital information packets carried by the network between, for example, a remote access server ("RAS" or Network Access Server "NAS") and a remote host. In a typical single class of service network, all information packets transmitted between source and destination RAS devices are treated as equal in priority. The network makes no differentiation or distinction between different packets and thus all packets are of the same priority and subject to the same network delivery latencies and delays.

Next-generation remote access servers will need to explicitly support multiple classes of service to implement new applications and services, such as live motion video or Voice-over-IP services that require real-time packet delivery performance. These classes of service may operate on a packet-by-packet basis and include options to differentiate the priority of packet forwarding and routing between packets on difference connections. Packet delivery classes of service can be based on pre-defined throughput, delay, jitter, and loss parameters. The network delivery option parameters are expected to be administratively initiated and enforced by the network on either a per-user or per-traffic-type basis.

For example, a network user may have an agreement with the network operator such that the network will stamp all of the users packets with a class of service defined by the particular per hop behavior ("PHB") of the packet. Or, the PHB of the packet could be based according to the type of traffic generated (i.e., low delay for remote login or high throughput for file transfer). Given the PHB of the packet, each router between the source and destination RAS will serve or deliver the user's packets according to the class of service described by the PHB marked in the packet. In this example, a packet marked with a PHB indicating low latency might be served before a packet marked for high throughput.

There is a great deal of latitude within the context of the framework for establishing different classes and subclasses of network traffic, as well as employing various queuing, forwarding and packet dropping disciplines. It is likely that traffic classification will be based on both technical and administrative concerns.

Regardless of the particular classes of service, each packet must be stamped with an appropriate PHB to indicate the classes of service of the packet. This stamping of the PHB in a packet may occur in many different places in the network, for example, at the user's initiating workstation, a remote access server providing access to users, a first-hop router, a gateway or even other places within the network. A packet may also be stamped with a PHB more than once as it travels across different networks owned by different entities. For security and accountability purposes, it may be desirable to limit the stamping of the PHB of packets in devices controlled by the users.

Naturally, any sort of service differentiation must be accompanied by an appropriate pricing scheme so that users will act efficiently with respect to the priority level they chose and thus the network resources that they consume. Network service providers are currently seeking more latitude in their service contracts with users. Implementing a differential service scheme according to pricing will give them this latitude.

While there is a great deal of debate today currently focused on stamping and restamping issues, RAS devices will play a major role in supporting multiple service classes. Needed is a system and method to efficiently implement stamping and management of PHB service levels in RAS devices.

SUMMARY OF THE INVENTION

In accordance with an illustrative embodiment of the invention, a method and device for implementing differential packet delivery services through a packet-based network is provided. According to the illustrative embodiment, a remote access server ("RAS") device provides differential packet delivery through the network according to a "per-hop behavior" or Differential Service Code Point (DSCP) field within the transmitted packets.

According to an aspect of the invention, the RAS device receives and interfaces a variety of different types of connections accessing the network such as data connections from the PSTN or from other networks. The RAS device is capable of marking packets transmitted to the network with the appropriate DSCP to provide a desired class of service as the packet is transmitted through the network.

According to another aspect of the invention, a RADIUS or DIAMETER server maintains the class of service for various users accessing the network. In an exemplary embodiment, the RADIUS/DIAMETER server maintains the appropriate DS bytes associated with each user. The DS byte contains the DSCP indicating the appropriate class of service for a user. The RAS device accesses the RADIUS/DIAMTER server device to obtain the appropriate DS byte to mark the packets for a particular user.

In addition, according to other aspects of the invention, a variety of other methods for marking packets according to other criteria such as on a per-modem basis can also be implemented.

The present embodiments allow users to select a desired class of service according to the particular requirements of the network application or user. For example, network applications with real-time delivery or large bandwidth requirements can specify and receive the appropriate packet delivery service to implement the desired service. The ability to control and charge applications and users fees according to the network resources they consume provides the ability to efficiently allocate and utilize network resources.

The foregoing and other features and advantages of an illustrative embodiment of the present invention will be more readily apparent from the following detailed description, which proceeds with references to the accompanying drawings.

BRIEF DESCRIPTION OF THE DRAWINGS

FIG. 3 shows an embodiment of a preferred IP header of a packet in the system of FIG. 1;

FIG. 4 shows an illustrative embodiment of an exemplary user profile of a user of system of FIG 1;

DESCRIPTION OF AN ILLUSTRATIVE EMBODIMENT

Exemplary Remote Network Access System

Figure 1:
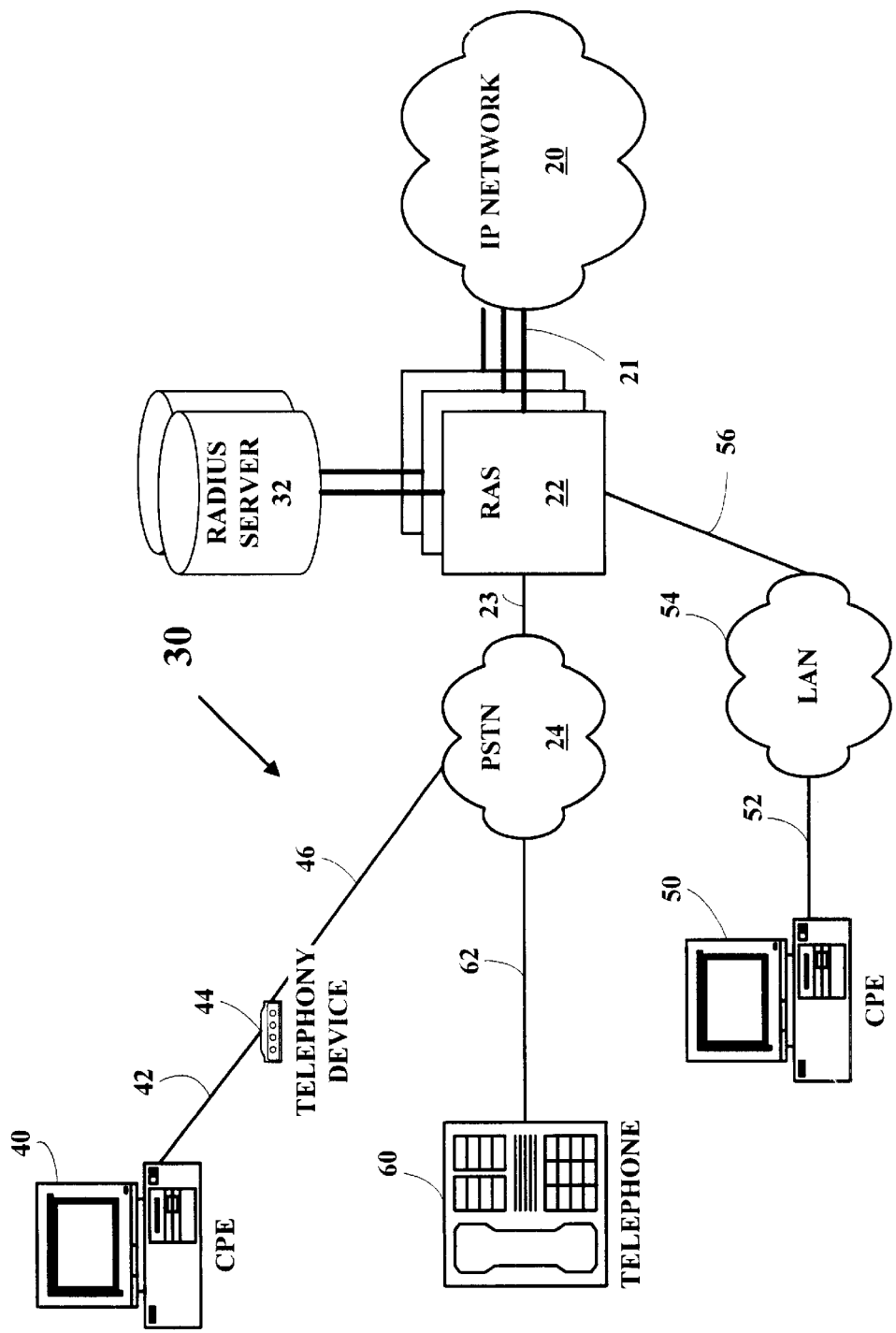
FIG. 1 shows an exemplary network access architecture implementing the present embodiment.

FIG. 1 shows an exemplary remote network access system suitable for implementing an illustrative embodiment of the invention. The remote network access system 30 provides a variety of different types of users access to an IP network or other type of packet-based network through a RAS 22.

In the example of FIG. 1, the system includes user customer premises equipment ("CPE") 40 and telephony device 44 connected via a communication line 46 over a Public Switched Telephone Network ("PSTN") 24 via a second communication line 23 to a Remote Access Server (RAS) 22. In this embodiment, RAS 22 is shown providing users dial-up access through the PSTN 24 and as well as access from other networks, such as a local area nework ("LAN") 54. Of course, RAS devices can also provide access from a number of other devices and communication networks as well. RAS 22 may be connected by connection 21 to the packet based network, such as an IP network 20. Communication lines 46 and 23 may be analog lines, or they may be digital lines (such as T1-carrier lines), or they may be a combination of analog and digital lines. Communication lines 46 and 23 need not be physical wire connections, and may instead be composed partially or entirely of wireless transmission technology, such as radio frequency (RF) communication. An example of one embodiment of such communication lines could be a cellular telephone link.

Also shown in FIG. 1 is a second CPE 50 preferably connected through a networking card and cable 52 to a local area network ("LAN") 54. The LAN 54 is connected through communication line 56 to RAS 22, so that CPE 50 may access the IP network 20. Communication line 56 is preferably a leased line, such as a leased T1 communication line. Other communication line implementations are possible as well. LANs are well known by those having skill in the art, as is the technology and methodology for accessing an IP network through an RAS from a LAN-based CPE.

Telephone 60 may be used to form a connection across communication line 62 through PSTN 24 and across communication line 23 to access RAS 22. Communication line 62 may be an analog circuit-switched connection provided by the telephone subscriber loops, local end offices, trunk connections and toll switches of the PSTN. Such a telephone-based system may be used for IP telephony using Voice over IP ("VoIP") connections provided by the IP network 20. For example, voice signals are digitized and packetized at RAS 22 according to the Internet Protocol ("IP") and transported across the network 20 to a remote device. Similarly, the system could be used to communicate information using Dual Tone Multi Frequency (DTMF) signaling, or voice signaling, for example.

CPEs 40 and 50 accessing the network 20 may each consist of a general purpose computing platform (such as an IBM PC compatible computer) running an operating system, such as Windows 95™, Windows 98™, or Windows NT™, all from Microsoft Corporation, or a UNIX operating system. Of course other commercially available computer and operating systems may alternatively be used as well. CPEs 40 and 50 may be at the home or office of a user, or they may be at some other location.

Telephony device 44 is preferably a modem communication device, such the U.S. ROBOTICS™ 56K FAXMODEM, manufactured by 3Com Corporation. At the customer premise, modems are typically used to send digital data signals over an analog PSTN connection, as previously described, or a digital connection. Typically, a modem converts digital data signals into an analog modulation so that digital data can be transmitted over the bandwidth limited connection through the PSTN. A second modem reverses the process in order to provide the recovered digital bit stream to a remote device, such as a computer system. Modems are standardized by the International Telecommunication Union, Telecommunication Standardization Section (ITU-T) as part of the well-known "V" series of standards, including, for example, Recommendation V.90 and Recommendation V.34. The ITU-T Recommendations V.90 and V.34 are incorporated by reference herein.

In addition to analog modems, other telephony devices may also be used in this embodiment of the invention. For example, Digital Subscriber Line (DSL) modems and cable modems, both bi-directional and unidirectional having a telco return, may also be used. It should be noted that although the word "modem" is used, which has its origins in the analog oriented phrase "MOdulator-DEModulator," no limitations are implied. Both analog and digital systems are supported, and "modem" is not necessarily used here to describe the technology of telephony device 44. Telephony device 44 may be external to user CPE 40, as shown in FIG. 1, or it may be internal. Internal telephony devices are also well known.

The connections illustrated in FIG. 1 between the PSTN 24 and CPE 40, and between the PSTN 24 and telephone 60, are provided as examples of typical connections. Those skilled in the art of data communication will appreciate that the examples are not limiting, in number or kind, the user connections to which the preferred embodiments are applicable.

Exemplary Remote Access Server

The various users connecting to the network 20 can be interfaced and provided access to the network by RAS 22. RAS 22 is a network device that concentrates a number of dial-up or dedicated access connections onto a shared medium to interface and access the network 20. Typically, Internet Service Providers (ISPs) use devices similar to RAS 22 to serve analog modem users who dial into the ISP network from the Public Switched Telephone Network. The RAS architecture, however, has wide applicability and can applied to provide access to and from ISDN, ADSL, Frame Relay, X.25 and T1-carrier users. Similar such devices having these capabilities are currently available from several companies, including 3Com Corporation, Ascend Communications, Livingston Enterprises, Multitech, and others. A preferred device is the Total Control™ Enterprise Network Hub, available from 3Com Corporation. The Total Control™ Enterprise Network Hub is described in the patent to Dale E. Walsh et al., U.S. Pat. No. 5,525,595, which is incorporated by reference herein.

Figure 2:
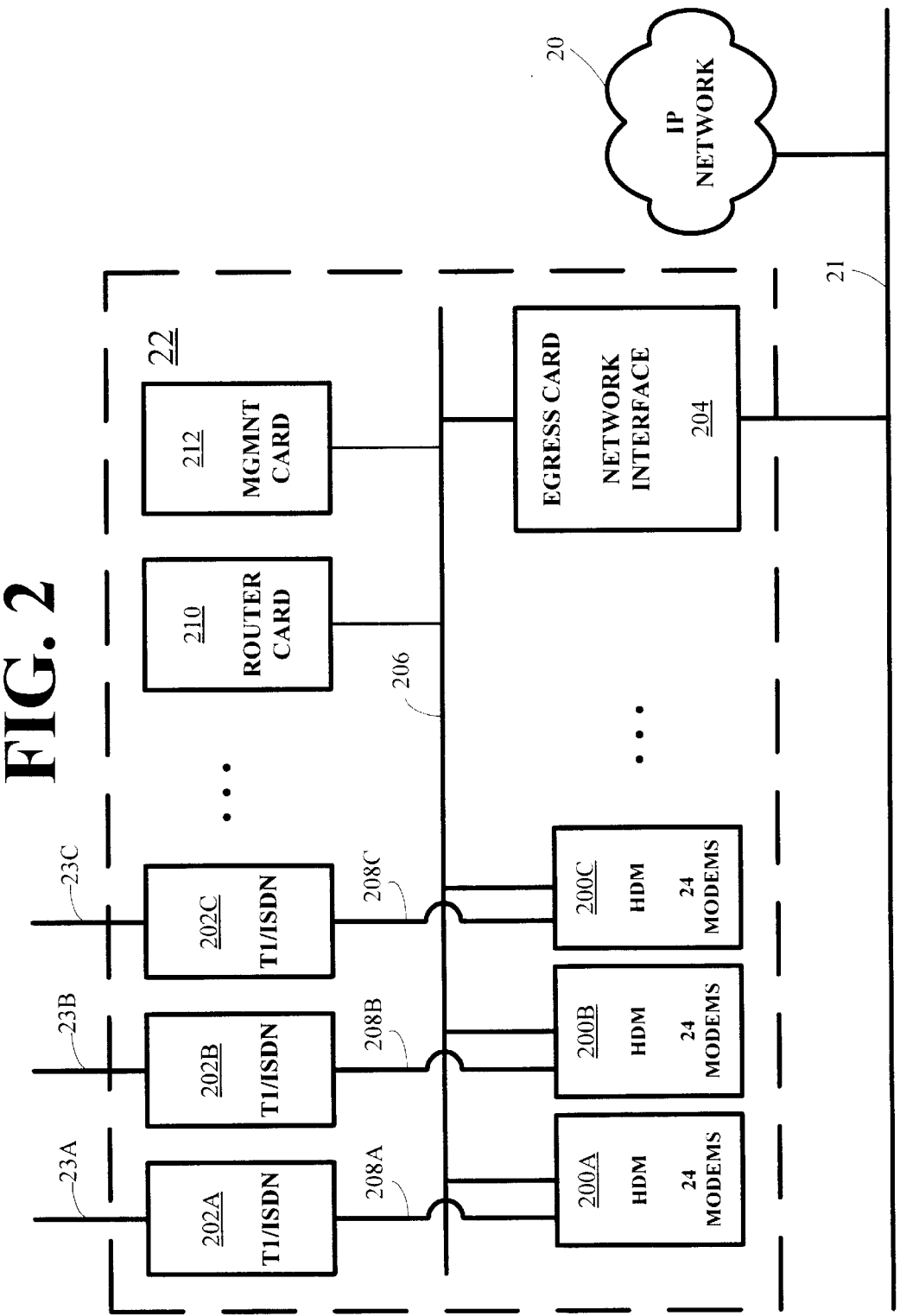
FIG. 2 shows a high level diagram of a network with a remote access server architecture implementing the current embodiment of the invention of the system of FIG. 1.

FIG. 2 shows the architecture of a preferred embodiment of RAS 22. The illustative embodiment includes a variety of application cards such as modem cards, T1/ISDN, network interface and egress cards, router cards, and management cards. The disclosed embodiment uses T1 lines, but those skilled in the art of data communication will appreciate that the example is not limiting, in number or kind, the connections to which the preferred embodiments are applicable. "HDM" is acronym for "high-density modem," indicating that each card performs modem functions for a plurality of data channels. For example, each high-density modem 200A–C may perform modem functions for 23B channels plus 1D channel for an ISDN Primary Rate Interface, 24 DS0 channels for a T1 line and 30 channels for an E1 line.

RAS 22 includes a plurality of high-density modems 200A–C each having a T1/ISDN telephone line interface 202A–C. The high-density modems 200A–C communicate with other devices in the RAS and a network interface 204 over a packet system bus (S-bus) 206. This packet bus 20 can be implemented with a version of Ethernet, ATM, or another packet network fabric technology on the physical layer. The high-density modems 200A–C, the T1/ISDN telephone line interfaces 202A–C, and the network interface 204 are preferably on individual printed circuit boards or cards arranged in a chassis.

By providing a set of high-density modems 200 and a robust computing platform in the network interface 204, a single chassis can process many hundreds of calls through RAS 70 simultaneously.

In the embodiment of FIG. 2, each high-density modem 200A–C has its own T1/ISDN telephone line interface 202A–C connected to an ISDN PRI or T1 line at connections 23A–C, respectively. Connections 23A–C may service connection 23 in FIG. 1, for example. The T1/ISDN telephone line interface 202 is connected to the high-density modem cards by a Time Division Multiplex (TDM) bus 208A–C. The TDM bus 208 and the T1/ISDN telephone line interface 202 of FIG. 2 are described in further detail in U.S. Pat. No. 5,525,595.

The T1/ISDN telephone line interface 202 card is composed of two separate modules, an incoming call interface module and an incoming call application module. The interface module physically receives the incoming T1 span lines at connections 62A–C, converts the signals into a digital TTL format, and delivers the signals to the incoming call application module. The interface module recovers clock signals and data from the incoming T1 signals, and also transmits outgoing digital telephone signals representing digital data to the T1 lines at connections 23A–C. The application module provides framing of recovered T1 data to extract the T1 DS0 channel data and then switches the channel data every twenty four time slots on the TDM bus 208 to the corresponding high-density modem 200.

An alternative for connecting the T1/ISDN telephone line interface cards 202A–C to the high-density modems 200A–C would be to provide a plurality of T1/ISDN telephone line interface cards 202 and distribute channel data to the modems via a TDM bus with extra highway lines, as described in Schoo et al., U.S. patent application Ser. No. 08/970,834, "DISTRIBUTED PROCESSING OF HIGH LEVEL PROTOCOLS, SUCH AS REAL TIME TRANSPORT PROTOCOLS, IN A NETWORK ACCESS SERVER," which is hereby incorporated by reference.

The network interface 204 consists of a general purpose computing platform (such as an IBM PC) running an operating system such as Windows 95™, Windows 98™, or Windows NT™ from Microsoft Corporation, or UNIX. The network interface card 204 contains software and hardware modules to perform call routing, modem configuration and other features as set forth and described for the gateway modules in U.S. Pat. No. 5,525,595 and U.S. Pat. No. 5,577,105, "TELEPHONE CALL ROUTING AND SWITCHING TECHNIQUES FOR DATA COMMUNICATIONS," issued to Baum et al., also incorporated by reference herein. Such a network interface card is available from 3Com Corporation under the trade name EDGESERVER™, which is further described in U.S. patent application Ser. No. 08/813,173, "COMMUNICATION ACCESS CHASSIS WITH GENERAL PURPOSE COMPUTING PLATFORM," issued to William Verthein et al., incorporated by reference herein.

Managing dispersed serial lines, modem pools for large numbers of users simultaneously connected to the RAS to access the network 20 can create the need for significant administrative support. Since modem pools are by definition a link to the outside world, they require careful attention to security, authorization and accounting of users accessing the network. This can be achieved by managing a single "database" of users, which allows for authentication (verifying user name and password) as well as configuration information detailing the type of service to deliver to the user (for example, SLIP, PPP, telnet, rlogin). In one embodiment, the RAS 22 is able to perform administrative tasks such as user authentication, accounting, and logging of user sessions.

RAS 22 may also optionally include a number of management cards and router cards or other types of application cards necessary to implement system functions. Router card 212 can be employed as network egress cards. Data from connection sessions accessing the RAS 22 are sampled and converted to digital bitstreams. With the router card installed, the bitstreams are packetized and transmitted on the packet bus to the router card 210. The router card 210 removes any link-layer headers from each packet, such as Ethernet, HDLC, or PPP headers and transmits the resulting IP packet to an egress card. Alternatively, the modem cards 200 may contain knowledge of IP headers and transmit the IP packets directly to the RAS gateway. The network management card 212 can perform administrative tasks such as user authentication, accounting and logging.

Exemplary RADIUS/DIAMETER Server

Alternatively, user authentication may be implemented outside of the RAS 22 to be handled within a RADIUS or DIAMETER server 32. RADIUS (Remote Authentication Dial In User Service) follows a client/server model where a RAS 22 operates as a client of the RADIUS server 32. Similarly, DIAMETER follows a client/server model that has evolved from RADIUS. The present embodiment may be utilized with a RADIUS and/or DIAMETER server, but for the sake of clarity, only the RADIUS server 32 will be discussed here. In the present embodiment, the RAS 22 client is responsible for passing user information to designated RADIUS servers 32, and then acting on the response returned by the RADIUS server 32. RADIUS servers 32 are responsible for receiving user connection requests, authenticating the user, and then returning all configuration information necessary for the RAS client to provide service to the user. A RADIUS server 32 can act as a proxy client to other RADIUS servers or other kinds of authentication server.

For the RADIUS/DIAMETER alternative, each dial-up user has a profile on the RADIUS server 32. The profile contains information such as user ID/password pairs, default serial line protocols and MTUs (maximum transfer units). For SLIP and PPP, this may include values such as IP address, subnet mask, MTU, desired compression, and desired packet filter identifiers. For character mode users, this may include values such as desired protocol and host. RADIUS is extensible; thus, it can be programmed to support virtually any user information. In this embodiment, a user profile may include a class of service field to indicate which class of service the packets from the user may utilize as described in more detail with reference to FIG. 4.

When a client is configured to use RADIUS/DIAMETER, a user of the client presents authentication information to the client. This might be implemented with a customizable login prompt, where the user is expected to enter their username and password. Alternatively, the user might use a link framing protocol such as the Point-to-Point Protocol (PPP), which has authentication packets to carry this information.

Once the client has obtained such information from a user, it may choose to authenticate the user's access using RADIUS. To do so, the client creates an "Access-Request" containing such Attributes as the user's name, the user's password, the ID of the client and the Port ID which the user is accessing. To implement security, transactions between the client and RADIUS server are authenticated through the use of a shared secret, which is not sent over the network. In addition, any user passwords are sent encrypted between the client and RADIUS server, to eliminate the possibility that snooping on an unsecure network could determine a user's password.

The RADIUS server 32 can also support a variety of methods to authenticate users seeking access to the network. When provided with the user name and original password given by the user, RADIUS can support PPP, PAP or CHAP, UNIX login, and other authentication mechanisms. RADIUS transactions are comprised of variable length Attribute-Length-Value 3-tuples. New attribute values can be added without disturbing existing implementations of the protocol. When a password is present, it is hidden using a method based on the RSA Message Digest Algorithm MD5 as know to those skilled in the art.

The Access-Request is submitted from the client 22 to the RADIUS server 32 via the network 20. If no response is returned within a length of time, the request is re-sent a number of times. The client 22 can also forward requests to an alternate server or servers not shown in the event that the primary server is down or unreachable. An alternate server can be used either after a number of tries to the primary server fail, or in a round-robin fashion. Retry and fallback algorithms are the topic of current research and are not specified in detail in this document.

Once the RADIUS server 32 receives the request, it validates the sending client. A request from a client 22 for which the RADIUS server 32 does not have a shared secret should be silently discarded. If the client is valid, the RADIUS server 32 consults a database of users to find the user whose name matches the request. The user entry in the database contains a list of requirements that must be met to allow access for the user. This always includes verification of the password, but can also specify the client(s) or port(s) to which the user is allowed access. The RADIUS server 32 may make requests of other servers in order to satisfy the request, in which case it acts as a client. If any condition is not met, the RADIUS server 32 sends an "Access-Reject" response indicating that this user request is invalid. If desired, the server may include a text message in the Access-Reject that may be displayed by the client to the user. No other Attributes are permitted in an Access-Reject.

If all conditions are met and the RADIUS server 32 wishes to issue a challenge to which the user must respond, the RADIUS server 32 sends an "Access-Challenge" response. It may include a text message to be displayed by the client to the user prompting for a response to the challenge, and may include a State attribute. If the client receives an Access-Challenge and supports challenge/response it may display the text message, if any, to the user, and then prompt the user for a response. The client then re-submits its original Access-Request with a new request ID, with the User-Password Attribute replaced by the response (encrypted), and including the State Attribute from the Access-Challenge, if any. Only 0 or 1 instances of the State Attributes should be present in a request. The server can respond to this new Access-Request with either an Access-Accept, an Access-Reject, or another Access-challenge.

If all conditions are met, the list of configuration values from the user' user profile are placed into an "Access-Accept" response to be transmitted back to the client.

In a typical dial-up session with RADIUS authentication, the client dials into the ISP and initiates a (Point-to-Point Protocol) PPP connection with the RAS 22. During the PPP setup and negotiation, the client transmits a user ID and password in response to the RAS login request. The RAS 22 passes this information to the RADIUS server 32, which authenticates the user in a local user database. At this time, the RADIUS server 32 may pass administrative information back to the client and/or the RAS 22. The RADIUS server 32 is also notified by the RAS 22 when the user's connection is dropped. RADIUS servers 32 log and timestamp all such activity. For more information on RADIUS, see Request For Comment RFC-2138, "Remote Authentication Dial In User Service (RADIUS)," published by the Internet Society in April 1997.

It will be understood by one of ordinary skill in the art that, although the description above is directed at using the Internet as the data network in the preferred embodiments, other data networks may be used as well. For data networks other than the Internet, one of ordinary skill in the art would know how to make the appropriate modifications to the example embodiments described below. Similarly, although the examples are described with reference to an Internet Service Provider (ISP), the concepts of the present invention apply to any entity that receives incoming calls and provides access to accounts having the capability to store email or other similar information.

Class of Service Support

In an illustrative embodiment of the invention, the RAS 22 can differentiate network services at the packet level by using the type-of-service (TOS) byte in the IP header (also known as the DS byte). Each IP packet includes an fP header such shown in FIG. 3. As seen in FIG. 3, the TOS byte is the third field in the IP header. The format of the TOS byte is typically defined as follows:

TABLE A (Prior Art)

| Precedence (3) | Type of Service (4) | MBZ (1) |

In the Table A, the 3-bit Precedence field uses the values 000–111 to indicate the priority or the importance of the packet. In this example, higher values are more important, and should be given greater priority over lower precedence packets.

Following the Precedence field, a 4-bit Type of Service field typically has five defined values that are utilized as follows:

TABLE B (Prior Art)

| TOS Value | Interpretation |
|---|---|
| 1000 | Minimize Delay |
| 0100 | Maximize Throughput |
| 0010 | Minimize Cost |
| 0000 | Normal |

In practice, most implementations ignore the TOS byte. A drawback to this classic TOS architecture is the only one parameter from the set of delay, throughout, reliability and cost can be affected per packet. Thus, for example, a user cannot simultaneously request low delay and high throughput. Typically, the 1-bit MBZ(must be zero) field is unused.

In the preferred illustrative embodiment, the TOS or "DS byte" will preferably have its fields re-defined to provide greater usability and functionality. In an exemplary embodiment, the DS byte fields are defined.

TABLE C

| DSCP (6) | Unused (2) |
|---|---|

In Table C above, the 6-bit Differential Service Code Point ("DSCP") or-Hop Behavior ("PHB") field specifies the general effect or priority that a router handling the packet should have on the packet. In an illustrative embodiment, the DSCP field is assigned 6-bits, but of course other numbers of bits may be used according to the desired application. Normal per-hop behavior is indicated with the value 000000, while expedited forwarding is indicated with the value 111000. Of course, with 6 available bits a wide range of priority or other behaviors (up to 64) can be provided. For example, Telnet can utilize a DSCP of 111000 while FTP operations may utilize 000000.

While the DSCP defines the expected behavior, the actual implementation (in terms of an algorithm or mechanism) of this behavior, however, can be left up to the administrative entity that is in charge of the router.

Packet Stamping

To implement the differentiation of packet delivery priority, the DS byte of the transmitted packets is preferably stamped with the appropriate DSCP. Stamping the DS bytes with the particular DSCP of a packet can be implemented in a variety of different ways.

Preferably, the RADIUS or DIAMETER server 32 (FIG. 1) stores levels or service class information assigned to users or user/traffic-type combinations. Whether or not an authentication mechanism is implemented with a RADIUS server 32, the following process can still be applied. Service class information is likely to be contained in one or more-pre-defined DS bytes to define different behaviors. Preferably, the user is identified and will have a user profile with a default DS byte associated with the user that is used to stamp his packets. In addition, the user may also have a selection of several such bytes and may dynamically switch between DS bytes based on the type of service currently desired. Or, the different DS bytes may be used for different:

Types of applications

Billing rates (i.e., based on time of day and/or peak usage periods), or

Combinations of source and destination IP addresses and ports (these combinations are usually referred to as flows).

The user need not be aware of DS byte changes based on these parameters.

Referring now to FIG. 4, shown is an exemplary user profile 400 including a default DS byte indicating a class of service for that user. In this simplified illustrative example, the user name 410 has an associated user identifier 412 and a device type 414 such as a personal computer. Preferably, a user profile includes a default DS byte 416 and may include number of other DS bytes 418–424 that can be used to stamp the packets from the user. It should be understood that the user profile of FIG. 4 is merely an illustrative representation. The user profile may take other embodiments and include other fields.

Alternatively, it is also possible for a RADIUS user profile to include DS bytes for the downstream direction (data flowing from an external host to the user) as well. In such circumstances the DS byte can be used by an application or transport layer protocol to request a particular behavior from the external host. Downstream DS byte service classes are also likely to depend on the business relationship between the user and the external host. The user may establish a particular service class for downstream data from a particular external host via an offline contract or agreement. In this case, no downstream DS byte needs to be specified in the user's profile, nor does one need to be sent to the external host.

Upon successful authentication of dial-up user, the RADIUS mechanism can pass the DS byte back to either the router card 210 or the appropriate modem card implementing the stamping of the packet with the appropriate DS byte. We consider each case separately.

PHB Stamping In The Modem Card

In another embodiment of the invention, the stamping of the PHB is performed in the modem cards of the RAS 22. When stamping is performed in the modem cards each modem port will have one or more DS bytes associated with it. Each modem processor or DSP must be IP-aware, and be able to remove PPP or other link-layer headers from IP packets.

Once an IP packet is isolated and buffered the DS byte can be stamped into the packet IP header. The particular DS byte to stamp can be determined by the current quality of service or precedence that the user has requested (and is paying for), the application(s) being used, the current billing rate or the flow information. The latter could be determined by TCP or UDP port number, current time of day, and source and destination IP addresses and port number, respectively, and transmitted to the RAS via control signaling (such as IPCP) on the dial-up link. All DS bytes must be given to the modem card 200 by a user authentication and profiling device; i.e., either a RADIUS server 40 or a network management card 24. Given that there may be multiple modems on a single HDM modem card, the stamping may occur local to each modem or centralized within the card.

Figure 5:
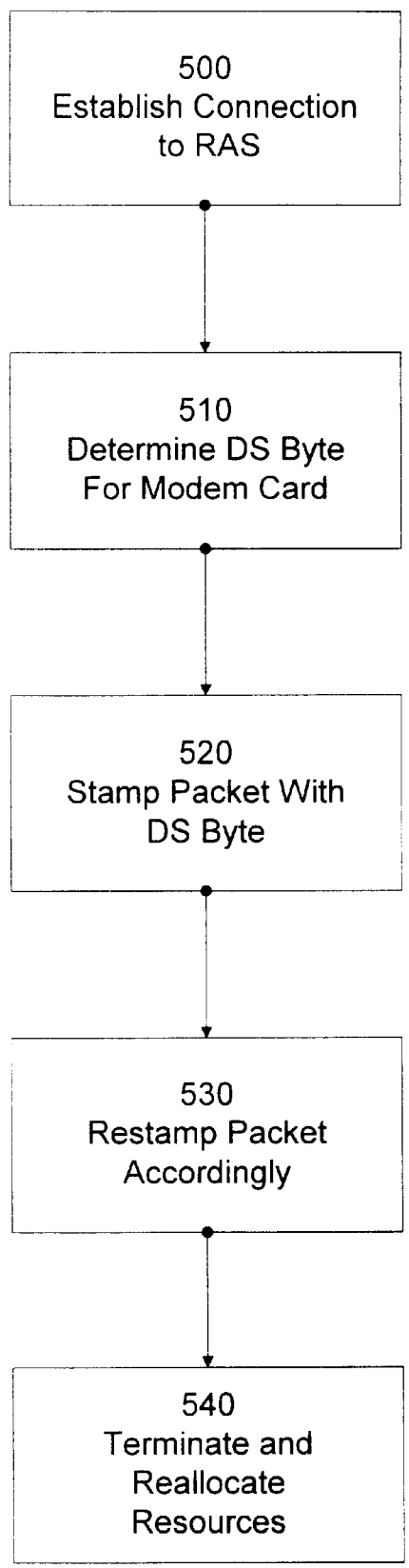
FIG. 5 shows a method of stamping packets by the modem card in the RAS of FIG. 2.

FIG. 5 shows a method illustrating how a modem card can implement support for multiple levels of service in an IP network.

At step 500, the user establishes a connection to the RAS to access the network. In the llustrative embodiment a dial-up connection is established through the PSTN to the RAS as previously described with respect to FIG. 1. Of course, other types of connections to access the RAS are also possible.

At step 510, the modem card is given the active modem's hardware address and a set of DS bytes. One of the DS bytes is indicated to be the default DS byte to stamp packets from the modem port.

At step 520, for each IP packet the user transmits, the router card will stamp the DS (TOS) byte of the packet with the current DS byte as indicated by the modem card.

At step 530, the user, application, ISP or some other entity such as a network operator may change the default DS byte at any time. For example, the particular ISP or network may have specific limitations or contractual arrangements requiring certain classes of service.

At step 540, then the user hangs up, the memory and resources utilized for stamping that particular user's packets are de-allocated. The network may have bandwidth limitations on the number of packets that can be allowed certain classes of service. Tracking and reallocating resources can properly manage such resources. In the case of the stamping mechanism being co-located with each individual modem, the resources may be dedicated.

PHB Stamping In The Router Card

In another embodiment of the invention, stamping of the PHB is performed in the router card 22. When stamping is performed in the router card 210, the card must maintain an array of DS bytes for each modem port. When a bitstream is received from a modem card, the modem port can be determined either from framing information on the packet bus or from the IP source address of the IP packet when it is reassembled from the bitstream. Once an IP packet is isolated and buffered, the DS byte can be stamped into the packet. The particular DS byte to stamp the packet can be determined by the current quality of service or precedence that the user has requested (and is paying for), the application(s) being used, the current billing rate or the flow information. The latter could be determined by TCP or UDP port number, current time of day, and source and destination IP addresses and port numbers, respectively, and transmitted to the RAS via control signaling (such as IPCP) on the dial-up link. All DS bytes must be given to the router card 210 by a user authentication and profiling device; i.e., either a RADIUS server 40 or a network management card 212. The router 210 maintains DS byte buffers for all active modems based on the modems' hardware address.

Figure 6:
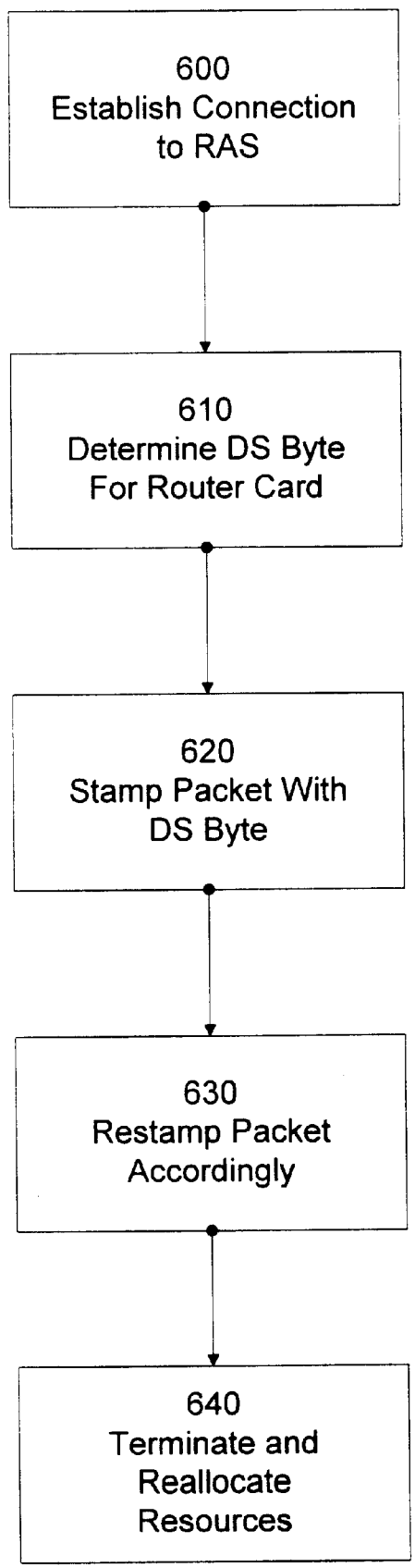
FIG. 6 shows a method of a stamping packets by the router card in the RAS of FIG. 2.

FIG. 6 shows a method for a router card can implement support for multiple levels of service in an IP network.

At step 600, the user establishes a connection to the RAS to access the network. In the illustrative embodiment a dial-up connection is established through the PSTN to the RAS as previously described with respect to FIG. 1. Of course, other types of connections to access the RAS are also possible.

At step 610, the router card is given the modem's hardware address and a set of DS bytes. One of the DS bytes is indicated to be the default.

At step 620, for each IP packet the user transmits, the router card will stamp the DS (TOS) byte of the packet with the current DS byte.

A step 630, the user, application, or some other entity may change the default DS byte at any time.

At step 640, when the user hangs up, the memory and resources utilized for stamping that particular user's packets are de-allocated.

IP fragmentation may cause a problem with this process because only the first packet of multiple fragments will have transport layer information (source and destination port numbers). The system should be designed such that the user clients set their MTU's small enough such that the bus between the modem cards and router card will not have to fragment IP packets.

Support For Resource Reservation

It may be desirable to support resource reservation in IP networks using a similar mechanism to that which we have described. As opposed to hop-by-hop service differentiation, resource reservation schemes allocate capacity at each router in the end-to-end communication path, and a negotiated quality of service is attempted to be maintained. In these schemes, packet stamping may or may not be necessary. However the storage and use of precedence and/or quality of service indicators will be similar.

User Controlled Selection Of Class Of Service (Bandwidth Arbitrage)

Another embodiment provides service selection with both user control as well as service provider control. Users may select the quality of service, i.e., amount of bandwidth depending on the particular type of application they are running and the cost they are willing to pay. The service selection could be pre-selected or it could be provided dynamically during a session.

Service Selection Prior to Session Start

A user may be offered multiple service types for each application. For each service type there is an associated quality of transmission (which can be either guaranteed or relative) and a cost commensurate with the service type.

As typical service offering may be as follows:

TABLE D

| | IP Telephony | | | Video Conferencing | | |
|---|---|---|---|---|---|---|
| | Bandwidth | Cost per minute (or any other time increment) | Service quality | Bandwidth | Cost per minute (or any other time increment) | Frame Resolution Ratio |
| Super Premium | 200 KBPS | 3 cents/minute | HI fidelity voice transmission 40 ms packet delay | 5–10 Mbps | 5 dollars/min | 1024 × 800 Press button to sample |
| Premium | 100 KBPS | 2 cents/minute | HI fidelity voice transmission 50 ms packet delay Press button to sample | 2–5 Mbps | 3 dollars/min | 800 × 600 Press button to sample |
| Basic | 25 KBPS | 1 cents/minute | Voice transmission with 150 ms packet delay Press button to sample | 1–2 Mbps | 1 dollar/min | 320 × 200 Press button to sample |

The particular classes of service and numeric values used above are only for illustrative purposes. As summarized above in Table D, a Super Premium class of service for IP Telephony service offers the highest class of service providing 200 Kbps of bandwidth with only a 40 ms packet delay. The cost of the Super Premium service in this example is shown as 3 cents per minute, which is a purely an exemplary cost. At a lower cost, Premium service offers a 100 Kbps of bandwidth with a 50 ms packet delay. The cost of Premium service is shown as only 2 cents per minute. Both the Super Premium and Premium service are suitable for high quality voice transmission.

At the lowest cost, the IP Telephony Basic class of service provides only 25 Kbps with 150 ms packet delay. The basic class of service is provided at, 1 cent per minute in this example.

For video conferencing the Super Premium class of service level provides the highest video quality, over 5 MHz of bandwidth to enable high-resolution video, 1024×800 pixels. The cost is commensurately expensive, shown as $5.00 per minute in this example. For a lower cost of $3 per minute, Premium quality of service level provides 2–5 MHz of bandwidth to enable 800×600 pixel resolution. For greatest economy, Basic video conferencing service provide 1–2 Mbps to enable 320×200 pixel resolution. The illustrative cost is set at $1 per minute.

According to this illustrative embodiment, a user has the flexibility to choose the quality of service according to their needs and willingness to pay. The cost of different types of service may also be varied depending on time and day or depending on bandwidth availability in the network.

To chose a class of service before initiating a session, a user may be offered a screen from which to select application, e.g., IP telephony, Video Conferencing, Multimedia Streaming, File Transfer. The screen will offer choices of different service levels and associated costs. There may be a button to press to sample the quality of service being offered.

Thus, a user views the service availability and price of quality of service, samples the quality of service available, makes a selection of the application and quality of service levels and initiates the session. The billing server at the RAS monitors the session and captures the billing information during and at the conclusion of the session. The subscribers may be billed at the end of the billing period if they have an account with the service provider. Alternatively, the user can offer a credit card against which to bill the service and the billing server generates appropriate billing information. Electronic cash systems may also be used.

The billing arrangements may be more complex. Several alternatives are receiver pays, receiver and initiator pay, third party pays.

Dynamic QOS Selection During Application Session

In addition to providing selection of quality of service at the beginning of a session, quality of service class can be dynamically changed and readjusted during a session. In the latter case, the class of service can be adjusted during a session to maximize or minimize bandwidth when necessary and control costs.

For example, one type of application session is characterized by uneven rates of data transfer going from extremely high packet transmission bursts to intervals of low packet transmission bursts. For example, a bursty session may require a great deal of transmission bandwidth for a short periods of time when data is being transmitted, but require very little bandwidth during times in between when no data is being transmitted. This scenario is applicable for applications where bandwidth usage varies considerably during a session, such as during a compressed video session. A typical example of an application session of this type may be a multimedia collaborative computing session, a Telemedicine consultation or a distance learning session. Such a session will be alternated by intervals with high data transfer such as when image files are being transferred versus intervals whereby only differential packets from a view image need to be sent. In such a session a user has the choice to dynamically alternate between different levels of service.

In such a case, a user may start with a certain level of service at the beginning of the session, however, during the session, then the user has the choice to alternate between different levels or qualities of service. Such flexibility allows user to efficiently use bandwidth according to their immediate needs and control costs as need.

Another embodiment allows users or service providers to take advantage of bandwidth availability and rate arbitrage during application sessions. This scenario is typically applicable for application sessions that may last for a long time or when the bandwidth cost of the network is very dynamically changing during short intervals of time. Again, in such an application session, the users may start with a level of service, and may switch to another level of service. According to this embodiment, the information on service tiers and costs of the service may be displayed in a ticker fashion on the display screen. If the user is using a device that does not have a display screen, then an audio announcement of the kind inserted in payphone calls (e.g., you have thirty seconds left please insert 50 more cents for the next three minutes) may be used. This will work in two ways. If the user is using a premium level of service and suddenly its cost goes up/down depending on network bandwidth availability, the user has the choice to retain the same quality of service level or to degrade or upgrade his/her QOS level.

This kind of service selection can be used both in public networks as well as dedicated enterprise networks. In an enterprise environment, departmental users would make similar choices between utility or quality of service and price tradeoffs.

The present embodiment preferably includes logic to implement the described methods in software modules as a set of computer executable software instructions. The Computer Processing Unit ("CPU") or microprocessor implements the logic that controls the operation of the channel card. The microprocessor executes software that can be programmed by those of skill in the art to provide the described functionality. The software can be represent as a sequence of binary bits maintained on a computer readable medium including magnetic disks, optical disks, organic disks, and any other volatile or (e.g., Random Access memory ("RAM")) non-volatile firmware (e.g., Read Only Memory ("ROM")) storage system readable by the CPU. The memory locations where data bits are maintained also include physical locations that have particular electrical, magnetic, optical, or organic properties corresponding to the stored data bits. The software instructions are executed as data bits by the CPU with a memory system causing a transformation of the electrical signal representation, and the maintenance of data bits at memory locations in the memory system to thereby reconfigure or otherwise alter the unit's operation. The executable software code may implement, for example, the methods described in further detail below.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of flow diagrams may be taken in sequences other than those described, and more or fewer elements may be used in the block diagrams.

It should be understood that a hardware embodiment may take a variety of different forms. The hardware may be implemented as an integrated circuit with custom gate arrays or an application specific integrated circuit ("ASIC"). Of the course, the embodiment may also be implemented with discrete hardware components and circuitry. Preferably, the present embodiment is embodied as a Programmable Logic Device.

We claim:

1. A network access server implementing differentiated classes of service, the network access server comprising:
   a plurality of communication devices receiving connections accessing a network;
   a shared communication bus in communication with the communication devices;
   an egress card in communication with the shared communication bus receiving the connections accessing the network, wherein the connections accessing the network are in a packet format; and
   a process for determining a class of service to mark Internet Protocol packets, wherein the process includes stamping a per hop behavior field within a type-of-service byte of at least one of the Internet Protocol packets, the per hop behavior field indicating the class of service for the Internet Protocol packets.

2. The network access server of claim 1 wherein the plurality of communication devices comprise telephone modems interfacing telephony connections from the public switched telephone network.

3. The network access server of claim 2 wherein the telephony connections comprise analog POTS telephone connections.

4. The network access server of claim 2 wherein the telephony connections comprise primary rate connections.

5. The network access server of claim 1 wherein the egress card comprises a network interface card.

6. The network access server of claim 1 wherein the egress card comprises a router card.

7. The network access server of claim 1 wherein the process for determining the class of service determines the class of service according to a user accessing at least one of the plurality of communication devices.

8. The network access server of claim 1 wherein the process for determining the class of service determines the class of service according to at least one of the plurality of communications devices receiving one of the connections accessing the network.

9. The network access server of claim 1 wherein the process for determining the class of service determines the class of service according to at least one of the plurality of communication devices.

10. The network access server of claim 1 further comprising:
    an external database specifying user information including a class of service.

11. The network access server of claim 10 wherein the external database comprises a RADIUS server.

12. A network access server implementing differentiated classes of service, the network access server comprising:
    a plurality of communication devices receiving connections accessing a network;
    a shared communication bus in communication access with the communication devices;
    an egress card in communication with the shared communication bus; and
    a process for determining a class of service to mark Internet Protocol packets,
    wherein each of the Internet Protocol packets contains a per hop behavior field within a type-of-service byte of the Internet Protocol packets, the per hop behavior field defining the class of service for the Internet Protocol packets.

13. The network access server of claim 12 wherein the per-hop behavior field comprises 6 bits.

14. The network access server of claim 12 further comprising:
    a user profile containing a default class of service for a particular user.

15. The network access server of claim 14 wherein the user profile comprises:
    a plurality of classes of service for a particular user.

16. A method comprising:
    establishing a connection to a packet-based network;
    determining a per hop behavior field for an Internet Protocol packet, the per hop behavior field defining a class of service for the Internet Protocol packet;
    stamping the per hop behavior field at a type-of-service byte of the Internet Protocol packet; and
    sending the Internet Protocol packet to the packet-based network,
    whereby the packet-based network transports the Internet Protocol packet in accordance with the class of service defined by the per hop behavior field.

17. The method of claim 16 wherein the stamping is implemented in a modem card.

18. The method of claim 16 wherein the stamping is implemented in a router card.

19. The method of claim 18 further comprising the step of restamping the Internet Protocol packet with another per hop behavior field, the other per hop behavior field being associated with a different class of service.

* * * * *